US006457676B1

(12) United States Patent
Breer et al.

(10) Patent No.: US 6,457,676 B1
(45) Date of Patent: Oct. 1, 2002

(54) METHOD AND APPARATUS FOR AIRCRAFT INLET ICE PROTECTION

(75) Inventors: Marlin D. Breer, Wichita, KS (US); Ronald F. Olsen, Woodinville, WA (US); Robert K. Kunze, Jr., Udall; Brian L. Riedel, Augusta, both of KS (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/970,047

(22) Filed: Oct. 2, 2001

Related U.S. Application Data

(63) Continuation of application No. 09/448,524, filed on Nov. 23, 1999.

(51) Int. Cl.$^7$ .............................. B64D 15/00; F02G 3/00
(52) U.S. Cl. ............................. 244/134 R; 244/134 B; 244/134 C; 60/39.093
(58) Field of Search ........................... 244/53 B, 134 R, 244/134 B; 60/39.093; 219/548; 165/122; 428/73; 454/116

(56) References Cited

U.S. PATENT DOCUMENTS

| | | | | | |
|---|---|---|---|---|---|
| 2,387,708 | A | * | 10/1945 | Arnhym | 244/1 R |
| 3,612,173 | A | * | 10/1971 | Goyal | 165/122 |
| 3,820,628 | A | | 6/1974 | Hanson | |
| 3,821,999 | A | | 7/1974 | Guess et al. | |
| 3,910,374 | A | | 10/1975 | Holehouse | |
| 3,917,193 | A | | 11/1975 | Runnels, Jr. | |
| 3,933,327 | A | | 1/1976 | Cook et al. | |
| 3,948,346 | A | | 4/1976 | Schindler | |
| 4,475,624 | A | | 10/1984 | Bourland, Jr. et al. | |
| 4,482,114 | A | | 11/1984 | Gupta et al. | |
| 4,508,295 | A | | 4/1985 | Cattaneo et al. | |

(List continued on next page.)

FOREIGN PATENT DOCUMENTS

| EP | 0 509 166 A1 | 10/1992 |
|---|---|---|
| EP | 0 893 342 A2 | 1/1999 |

OTHER PUBLICATIONS

Dean, P. D., "On the 'In–Situ' Control of Acoustic Liner Attenuation," Journal of Engineering for Power, Jan. 1977, pp. 63–70.

Hwang, Danny P., "A Proof of Concept Experiment for Reducing Skin Friction By Using a Micro–Blowing Technique," NASA Technical Memorandum 107315, AIAA–97–0546, 35th Aerospace Sciences Meeting and Exhibit, American Institute of Aeronautics and Astronautics, Reno, Nevada, Jan. 6–9, 1997, pp. 1–11.

Ingard, Uno and Ising, Hartmut, "Acoustic Nonlinearity of an Orifice," The Journal of the Acoustical Society of America, vol. 42, No. 1, 1967, pp. 6–17.

Kim, John J., "Heat Transfer Model of a Jet Pump Cowl Anti–Ice System," 1996 World Aviation Congress, SAE International and American Institute of Aeronautics and Astronautics, Los Angeles, California, Oct. 21–24, 1996, pp. 1–15.

*Primary Examiner*—Peter M. Poon
*Assistant Examiner*—Timothy D. Collins
(74) *Attorney, Agent, or Firm*—Perkins Coie LLP (57) ABSTRACT

An inlet ice protection system, and methods for making and using ice protection systems. In one embodiment, the inlet includes an acoustic liner positioned forward of the inlet throat and has a perforated face sheet, a perforated back sheet, and an acoustic core between the face sheet and the back sheet. The perforations through the face sheet are sized to allow acoustic energy to be transmitted to and dissipated in the acoustic core, and the perforations in the back sheet are sized to transmit hot gas through the acoustic liner to the surface of the inlet to heat the inlet and prevent and/or restrict ice formation on the inlet. The face sheet can have a higher porosity than the back sheet, and both the sheets and the core can be formed from titanium to withstand high gas temperatures.

24 Claims, 5 Drawing Sheets

U.S. PATENT DOCUMENTS

| | | |
|---|---|---|
| 4,522,859 A | 6/1985 | Blair |
| 4,674,714 A | 6/1987 | Cole et al. |
| 4,688,745 A | 8/1987 | Rosenthal |
| 4,738,416 A | 4/1988 | Birbragher |
| 4,743,740 A * | 5/1988 | Adee ........................ 156/273.9 |
| 4,749,150 A | 6/1988 | Rose et al. |
| 4,752,049 A | 6/1988 | Cole |
| 4,757,963 A | 7/1988 | Cole |
| 4,759,513 A | 7/1988 | Birbragher |
| 4,926,963 A | 5/1990 | Synder |
| 5,011,098 A | 4/1991 | McLaren et al. |
| 5,025,888 A | 6/1991 | Arcas et al. |
| 5,041,323 A * | 8/1991 | Rose et al. .................. 181/292 |
| 5,041,324 A | 8/1991 | Siegling et al. |
| 5,088,277 A | 2/1992 | Schulze |
| 5,114,100 A | 5/1992 | Rudolph et al. |
| 5,400,984 A | 3/1995 | Arnold et al. |
| 5,415,522 A | 5/1995 | Pla et al. |
| 5,423,658 A | 6/1995 | Pla et al. |
| 5,498,127 A | 3/1996 | Kraft et al. |
| 5,590,849 A | 1/1997 | Pla |
| 5,683,062 A | 11/1997 | Spiro et al. |
| 5,702,231 A | 12/1997 | Dougherty |
| 5,776,579 A * | 7/1998 | Jessup et al. ................ 181/288 |
| 5,841,079 A * | 11/1998 | Parente ........................ 181/214 |
| RE36,215 E | 6/1999 | Rosenthal |

\* cited by examiner

METHOD AND APPARATUS FOR AIRCRAFT INLET ICE PROTECTION

CROSS REFERENCE TO RELATED APPLICATION

This application is a continuation of U.S. patent application Ser. No. 09/448,524, entitled "METHOD AND APPARATUS FOR AIRCRAFT INLET ICE PROTECTION" filed on Nov. 23, 1999.

TECHNICAL FIELD

The present invention is directed toward methods and apparatuses for protecting acoustically treated aircraft inlets from ice formation.

BACKGROUND OF THE INVENTION

Many commercial jet aircraft are subject to governmental regulations that limit the permissible noise levels generated by the aircraft near airports. One source of noise from jet aircraft is engine noise that propagates forward from the engine through the air intake or inlet. One method for attenuating inlet noise is to line the inlet with an acoustic liner that includes a honeycomb core sandwiched between a perforated front sheet and a solid back sheet. Accordingly, each cell of the honeycomb core has an opening at the front sheet and defines a Helmholtz resonator. The perforated front sheet is aligned with the inlet flow so that sound waves in the inlet pass through the front sheet and into honeycomb core where they are dissipated. The acoustic liner typically extends along the inner surface of the inlet to the engine.

Commercial jet aircraft inlets also typically include ice protection systems to restrict ice formation on the aircraft when flying in icing conditions. During such flights, ice can form at the inlet hilite and along the inlet inner and outer surfaces. To prevent ice from accumulating in the inlet, ice protection systems are designed to prevent the ice from forming.

One type of inlet anti-icing system directs hot air from the engine against the backside of the inlet inner surface, heating the inner surface to prevent ice from forming. One problem with this system is that it may not operate effectively when the inlet is lined with an acoustic liner. For example, the honeycomb cells of the acoustic liner contain generally static air, which insulates the inlet inner surface from the hot air. This can significantly reduce the heat transfer rate to the inlet inner surface and/or increase the amount of hot air required to protect the inlet from ice formation.

An approach to addressing this drawback is to have an acoustic honeycomb core with a perforated back sheet that allows the hot air to pass through the honeycomb core and the perforated front sheet. The hot air then transpires along the inlet inner surface. U.S. Pat. No. 5,841,079 to Parent discloses such a system. However, this approach may also suffer from certain drawbacks. For example, the transpiration system may not efficiently distribute the hot air removed from the engine. Accordingly, the system may require unnecessarily large amounts of hot air to be bled from the engine, which can reduce engine thrust and overall aircraft performance. Furthermore, the distribution of the hot air passing through the acoustic liner may be altered by static and dynamic pressure gradients on the inlet inner surface caused by the inlet flow field. For example, the pressure at any point in the inlet flow field can be a function of the location in the flow field, aircraft attitude, and the engine power setting. The altered hot air distribution may reduce the efficiency with which the system operates.

SUMMARY OF THE INVENTION

The present invention is directed toward methods and apparatuses for protecting an aircraft inlet from ice formation. An apparatus in accordance with one aspect of the invention includes an external surface portion, an internal surface portion positioned inwardly of the external surface portion, and a lip surface portion extending between the external surface portion and the internal surface portion to define a hilite. At least one of the lip surface portion and the internal surface portion define an inlet flow surface having a minimum flow area aft of the hilite. The inlet flow surface also has first apertures defining a first porosity. A back surface is offset from the inlet flow surface and has second apertures defining a second porosity less than the first porosity. An acoustic core is positioned between the back surface and the inlet flow surface such that the first apertures are in fluid communication with the second apertures through the core. The second apertures are coupleable to a source of pressurized, heated gas to direct a quantity of the gas through the first apertures sufficient to at least restrict the formation of ice on the inlet flow surface. The reduced porosity of the back surface can control the distribution of the heated gas and can improve the acoustic performance of the core.

In another aspect of the invention, the second apertures are positioned only in a region at or forward of the minimum flow area of the inlet. In still another aspect of the invention, the porosity of the inlet flow surface is different in a region proximate to the hilite than in a region proximate to the minimum flow area. In yet another aspect of the invention, the heated gas is provided to a plenum adjacent to the back surface through a single opening in the plenum wall. The apparatus can further include a deflector plate positioned to deflect the hot gas arriving from the conduit into the plenum. The front surface, the back surface and the honeycomb core can be formed from titanium to withstand temperatures of at least 400° F.

The present invention is also directed to a method for forming an ice protection system for an aircraft engine inlet. In one aspect of the invention, the method can include disposing an acoustic core between a flow surface of the inlet and a back surface of the inlet, forming first apertures through the flow surface and forming second apertures through the back surface to define a second porosity less than the first porosity. The second apertures are sized to pass a flow of pressurized heated gas through the first apertures sufficient to at least restrict ice formation on the flow surface. In one aspect of this method, the second apertures are provided in a region only at and/or forward of the minimum flow area of the inlet.

The present invention is also directed toward a method for protecting an aircraft engine inlet from ice formation. The method can include directing pressurized heated gas through a back surface of the inlet, through an acoustic core adjacent to the back surface, and through a flow surface opposite the back surface of the inlet only in a region at or forward of a minimum flow area of the inlet. The method can further include attenuating sound waves in the inlet by receiving the sound waves in the first apertures.

DETAILED DESCRIPTION

The present disclosure describes methods and apparatuses for protecting aircraft inlets from ice formation. Many specific details of certain embodiments of the invention are set forth in the following description and in FIGS. 1–8 to provide a thorough understanding of these embodiments. One skilled in the art, however, will understand that the present invention may have additional embodiments, and the invention may be practiced without several of the details described in the following description.

Figure 1:
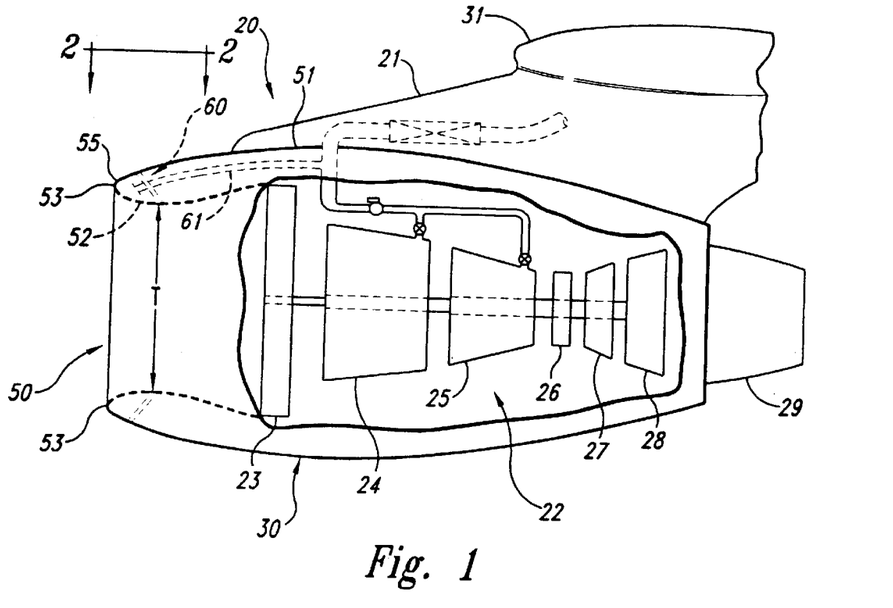
FIG. 1 is a partially schematic, side elevational view of an aircraft propulsion turbine engine mounted in a nacelle having an ice protection system in accordance with an embodiment of the invention.

FIG. 1 is a partially schematic, side elevational view of an aircraft turbine propulsion assembly 20 having an ice protection system 60 in accordance with an embodiment of the invention. The propulsion assembly 20 includes a turbine engine 22 housed in a nacelle 30 secured to wing 31 by a strut 21. The nacelle 30 includes an inlet 50 that supplies air to the turbine engine 22 and a tailpipe 29 that directs exhaust products away from the engine 22.

In one embodiment, the engine 22 includes a low-pressure compressor 24 and a high-pressure compressor 25 mounted on concentric spools. The compressors 24 and 25 pressurize the air provided by the inlet 50 and direct the pressurized air to a combustor 26. In the combustor 26, the pressurized air is mixed with fuel and burned. The hot exhaust products pass through a high-pressure turbine 27 (which drives the high-pressure compressor 25) and through a low-pressure turbine 28 (which drives the low pressure 24 and a fan 23) before exiting through the tailpipe 29.

The inlet 50 is typically configured to have low external and internal drag. Accordingly, the inlet 50 can include a smoothly contoured external surface 51, a smoothly contoured internal surface 52, and a lip surface 55 extending between the external surface 51 and internal surface 52. The lip surface 55 defines a leading edge or hilite 53 at its forward-most point, and either the lip surface 55 or the internal surface 52 define a minimum inlet flow area or throat "T" aft of the hilite 53. During some flight conditions, water droplets typically impinge on the inlet 50 in a region that extends roughly from the hilite 53 internally to the throat T and externally along the external surface 51. Accordingly, the ice protection system 60 is configured to inhibit the water droplets from forming into ice by directing hot air to those portions of the inlet 50 generally impinged by water droplets.

In one embodiment, the ice protection system 60 includes a conduit 61 coupled to the low-pressure compressor 24 and/or the high-pressure compressor 25 to extract a portion of the hot, compressed air from the engine 22 upstream of the combustor 26. Alternatively, the conduit 61 can receive hot gas from other portions of the engine 22 or aircraft. In either embodiment, the conduit 61 diverts the hot gas to the backside of the lip surface 55 to protect this surface from ice formation, as will be discussed in greater detail below with reference to FIG. 2.

Figure 2:
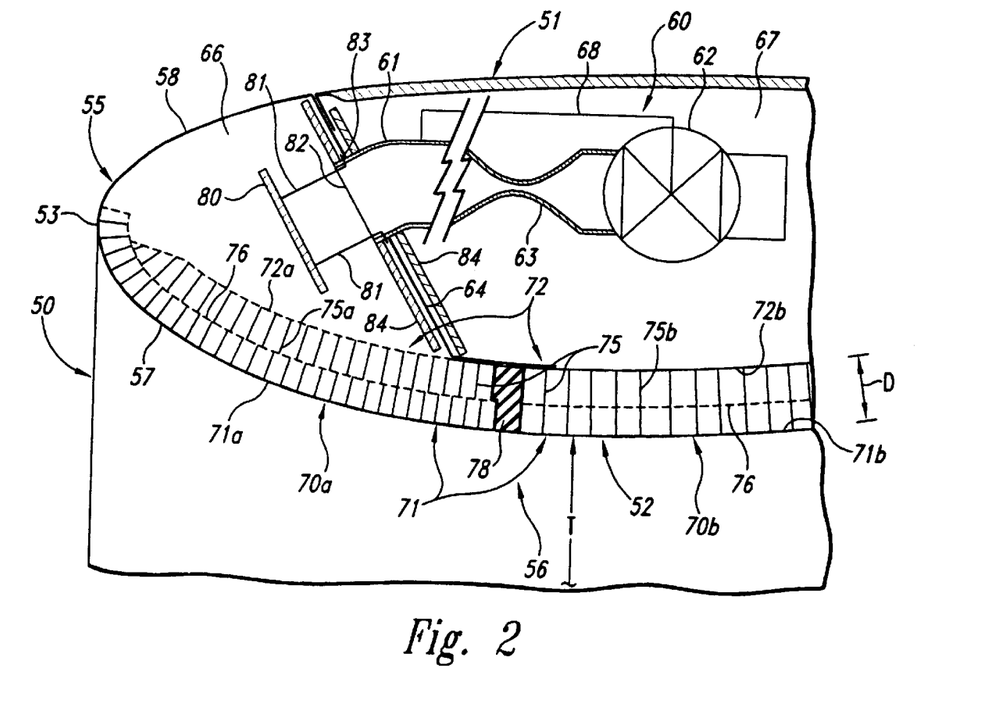
FIG. 2 is a partially schematic, partial cross-sectional side elevational view of a portion of the nacelle taken substantially along line 2—2 of FIG. 1.

FIG. 2 is a partially schematic, cross-sectional view of a portion of the inlet 50 taken substantially along line 2—2 of FIG. 1. The inlet 50 includes a bulkhead 64 that divides the region between the external surface 51 and the internal surface 52 into a forward plenum 66 and an aft plenum 67. Accordingly, the forward plenum 66 is bounded by the bulkhead 64 and the lip surface 55, and the aft plenum 67 is bounded by the bulkhead 64, the external surface 51 and the internal surface 52. In one aspect of this embodiment, the throat T intersects the internal surface 52 just aft of the bulkhead 64. In other embodiments the inlet 50 can have other configurations. For example, the inlet 50 can be shaped such that the throat T is positioned forward of the bulkhead 64 and intersects the lip surface 55. In other embodiments, the boundaries between the lip surface 55, the internal surface 52 and the external surface 51 can have relative locations different than those shown in FIG. 2 and/or these surfaces can be integral with each other.

The inlet lip surface 55 includes an exterior portion 58 extending externally aft of the hilite 53 to the external surface 51, and an interior portion 57 extending internally aft of the hilite 53 to the internal surface 52. In one aspect of this embodiment, the interior portion 57 and the exterior portion 58 are integrally formed to define a seamless inlet lip surface 55. In another aspect of this embodiment, the exterior portion 58 of the lip surface 55 is perforated and the external surface 51 includes a honeycomb core sandwiched between solid face sheets. Alternatively, the exterior portion 58 can be a solid sheet and the external surface 51 can have other constructions.

The interior portion 57 of lip surface 55 and the internal surface 52 together define an inlet flow surface 56 that compresses the inlet air flow from the hilite 53 to the throat T. The inlet flow surface 56 includes acoustic liners 70, shown as a forward liner 70a forward of the bulkhead 64 and an aft liner 70b aft of the bulkhead 64, that dissipate noise transmitted through the inlet 50. Each of the liners 70 includes a honeycomb core 75 sandwiched between sheets 71 and 72 (separately identified by reference numbers 71a/71b and 72a/72b in FIG. 2). The aft liner 70b includes a honeycomb core 75b sandwiched between a perforated face sheet 71b and a solid back sheet 72b. The forward liner 70a includes a honeycomb core 75a sandwiched between a perforated face sheet 71a and a perforated back sheet 72a. The forward liner 70a is separated from the aft liner 70b by a sealant 78 that seals and insulates the boundary between the liners 70. In one embodiment, the forward liner 70a and the aft liner 70b can have approximately equal depths D of from about 0.5 inch to about 2.5 inches. Alternatively, the liners 70a and 70b can have different depths depending, for example, on local noise attenuation requirements and space availability.

In one embodiment, the forward liner 70a extends for a short distance around the inlet 50 external to the hilite 53.

Alternatively, the forward liner 70a can have other lengths relative to the hilite 53 depending on the acoustic characteristics of the inlet 50. In one embodiment, the forward liner 70a and/or the aft liner 70b includes a perforated intermediate layer 76 between the face sheets 71 and the back sheets 72a, 72b, as will be discussed in greater detail with reference to FIG. 3. Whether or not the liners 70 include the intermediate layer 76, hot gas enters the forward plenum 66 from the conduit 61 and passes through both the perforated exterior portion 58 of the lip surface 55 and the perforated forward liner 70a to protect the inlet 50 from ice formation, as will also be discussed in greater detail below with reference to FIG. 3.

Figure 3:
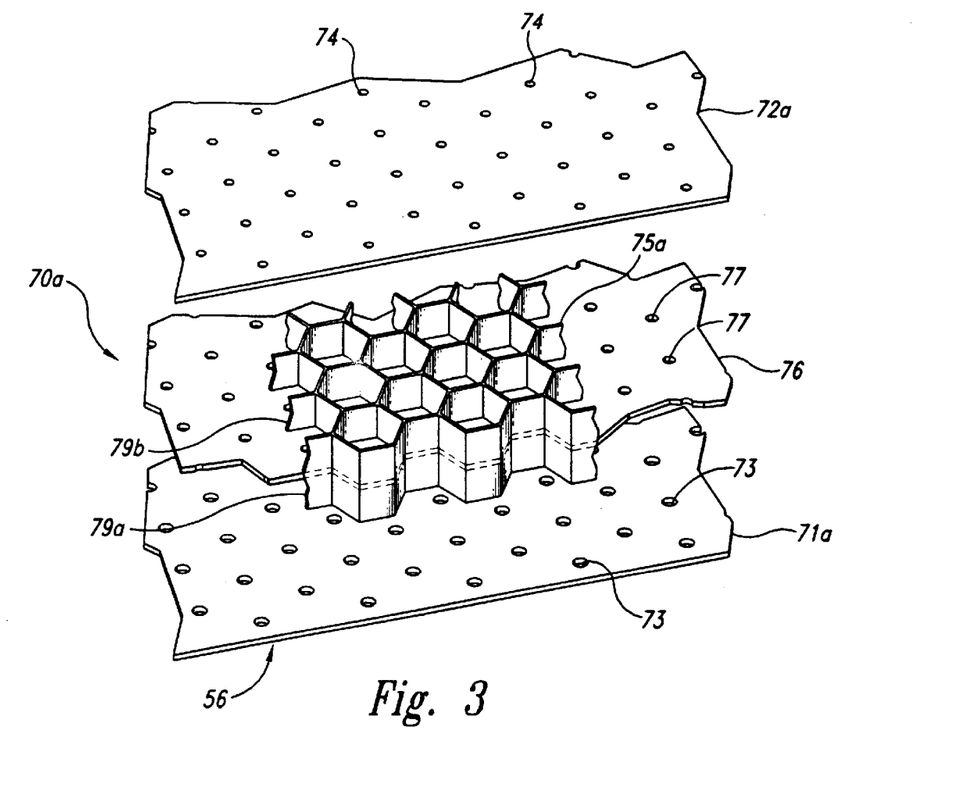
FIG. 3 is an exploded isometric view of a portion of the nacelle shown in FIGS. 1 and 2 having an acoustic honeycomb core in accordance with an embodiment of the invention.

FIG. 3 is a partially exploded isometric view of a portion of the forward liner 70a shown in FIG. 2. The back sheet 72a includes back sheet apertures 74 and the face sheet 71a includes face sheet apertures 73. In one embodiment, each cell of the honeycomb core 75a is aligned with at least one back sheet aperture 74 and at least one face sheet aperture 73 so that hot gas flows through the entire face sheet 71a. Alternatively, the honeycomb core 75a can be slotted to allow hot gas to travel between adjacent cells, as will be discussed in greater detail below with reference to FIG. 4F.

In one aspect of the embodiment shown in FIG. 3, the face sheet apertures 73 are larger than the back sheet apertures 74. Accordingly, the open area of the face sheet 71a is substantially larger than the open area of the back sheet 72a. For example, in one aspect of this embodiment, the face sheet apertures 73 have a diameter of about 0.008 inch and the face sheet 71a has an open area or porosity of from about 3% to about 10%. The back sheet apertures 74 have a diameter of about 0.002 inch and the back sheet 72a has a porosity of from about 0.12% to about 0.50%. Alternatively, the face sheet 71a and the back sheet 72a can have other configurations in which the porosity of the face sheet 71a is greater than that of the back sheet 72a. For example, the face sheet apertures 73 can have the same size as the back sheet apertures 74, but the face sheet apertures 73 can be spaced closer together than the back sheet apertures 74 to provide a higher porosity to the face sheet 71a than the back sheet 72a.

In either embodiment of the forward liner 70a discussed above, the relatively high porosity of the face sheet 71a reduces the pressure loss through the face sheet apertures 73. Accordingly, the pressure within the honeycomb core 75a is approximately equal to the pressure along the inlet flow surface 56, and the face sheet apertures 73 do not significantly effect the flow of air into and out of the honeycomb core 75a as sound waves pass over the inlet flow surface 56. Another feature of the high-porosity face sheet 71a is that the pressure gradient across the face sheet 71a will be reduced. The low pressure gradient across the face sheet 71a will be less likely to separate the face sheet 71a from the honeycomb core 75a. Conversely, the back sheet 72a (which has a relatively high pressure differential across it), will be forced into engagement with the honeycomb core 75a, increasing the structural integrity of the forward liner 70a.

Another feature of the relatively low porosity of the back sheet 72a is that it limits the amount of hot gas passing into the honeycomb core 75a to prevent over-heating of the honeycomb core 75a and the inlet flow surface 56. For example, in one aspect of this embodiment, the back sheet apertures 74 can be sized to choke the flow of hot gas. Still further, the low porosity of the back sheet 72a reduces the impact of the back sheet apertures 74 on the acoustic characteristics of the honey comb core cells. For example, the low porosity back sheet 72a can behave acoustically like a solid surface at audible frequencies.

In one embodiment, the porosity of the back sheet 72a can vary depending on the distance from the hilite 53 (FIG. 2). For example, the porosity of the back sheet 72a can decrease in a continuous or stepwise manner from about 0.20% near the hilite 53 to about 0.12% near the throat T (FIG. 2). Accordingly, the forward liner 70a can supply more hot air to the hilite region (where moisture impingement tends to be relatively high) than to the throat region (where moisture impingement tends to be relatively low). In other embodiments, other devices can control the distribution of the anti-icing gas. For example, the forward plenum 66 (FIG. 2) can be divided into a series of plenums, with plenums near the hilite 53 having a higher pressure than those near the throat T.

The embodiment shown in FIG. 3, the intermediate layer 76 between the face sheet 71a and the back sheet 72a includes intermediate apertures 77 sized to allow the hot gas to pass entirely through the honeycomb core 75a. The intermediate apertures 77 can be sized and spaced to provide the intermediate layer 76 with a porosity that is between the porosity of the back sheet 72a and the face sheet 71a. For example, the intermediate apertures 77 can have a diameter of about 0.040 inch and the intermediate layer 76 can have a porosity of from about 1% to about 3%. The intermediate layer 76 can be formed by inserting individual portions of the layer into each cell of the honeycomb core 75a. Alternatively, the honeycomb core 75a can include an inner portion 79a sandwiched between the face sheet 71a, and the intermediate layer 76, and an outer portion 79b sandwiched between the intermediate layer 76 and the back sheet 72a. The separate honeycomb portions 79a and 79b are bonded to the intermediate layer 76 and the adjacent face sheet 71a or back sheet 72a to form a single unit.

One feature of the intermediate layer 76 is that it can improve the sound attenuation of the forward liner 70a by increasing the frequency bandwidth over which the cells of the honeycomb core 75a dissipate noise. Another advantage (relevant when the honeycomb core 75a includes initially separate inner and outer portions 79a and 79b) is that two relatively shallow honeycomb cores can be more easily formed into compound curves (such as are present in the lip region of the inlet 50) than can one relatively deep honeycomb core. For example, the inner and outer portions 79a and 79b of the honeycomb core 75a, together with the face sheet 71a, intermediate layer 76 and back sheet 72a, can be formed into the compound shape of the lip region of the inlet 50 and then bonded using a diffusion bonding technique discussed below. Still another advantage is that the intermediate layer 76 can add strength and rigidity to the forward liner 70a. The additional strength can be particularly important near the hilite 53 (FIG. 2) to protect the lip 55 from foreign object damage.

In one embodiment, the face sheet 71a and the back sheet 72a are brazed or welded to the honeycomb core 75a. Alternatively, these components can be attached with adhesives. In another alternative embodiment, the components of the forward liner 70a can be attached using a diffusion bonding process. As used herein, diffusion bonding refers to a process for joining metals by subjecting them to elevated pressure and temperature without applying an adhesive or filler material to the joint area. Such processes are performed by Aeronca, Inc. of Cincinnati, Ohio. An advantage of the diffusion bonding process is that the process is less likely to block the face sheet apertures 73a and/or the back sheet apertures 74a because the process does not require filler materials or adhesives.

The face sheet 71a, back sheet 72a and the honeycomb core 75a can be formed from aluminum or carbon composites. Alternatively, the face sheet 71a, the back sheet 72a and the honeycomb core 75a can be formed from titanium. One feature of titanium components for the forward liner 70a is that they can withstand temperatures of from 400° F. up to and in excess of 1000° F. Accordingly, bleed air for ice protection can be ducted directly from the engine 22 (FIG. 1) to the forward plenum 66 (FIG. 2) without first cooling the bleed air. An advantage of this arrangement is that it can save weight. For example, a heat exchanger (not shown), normally required to cool the bleed air, can be eliminated. Furthermore, the hot bleed air has a higher heat transfer coefficient than cooled bleed air. Accordingly, the flow rate of the hot bleed air can be reduced, compared to the flow rate of cooled bleed air, without reducing the overall heat transfer rate. As a result, the conduit 61 (FIG. 1) can be smaller and lighter, reducing no the overall aircraft weight.

Another advantage of the titanium components discussed above is that they can withstand temperatures high enough to vaporize solid, organic debris (such as insects) that may impinge the inlet flow surface 56. For example, organic debris can be removed by heating the face sheet 71a to a temperature of about 900° F., which is not feasible with conventional aluminum or carbon composite components that cannot withstand such high temperatures.

Returning to FIG. 2, the face sheet 71a is heated when the conduit 61 provides hot gas to the back sheet 72a and the hot gas passes through the honeycomb core 75a. In one embodiment, the conduit 61 can include a regulating valve 62 to control the rate of gas flow through the conduit 61. The regulating valve 62, for example, can be coupled to a temperature and/or flow sensor (not shown) via a feedback loop 68 to automatically adjust the flow of gas through the conduit 61 in response to conditions sensed within the conduit 61. Alternatively, the feedback loop 68 can be coupled to an external sensor to control the regulating valve 62 based on the temperature and/or humidity of the air outside the inlet 50. Accordingly, the regulating valve 62 can be controlled automatically to provide hot gas when anti-icing conditions are encountered. The regulating valve 62 can be overridden manually and/or can be controlled exclusively manually in alternate embodiments.

The conduit 61 can also include a venturi 63 that limits the flow of gas through the conduit 61 should the regulating valve 62 fail. In one aspect of this embodiment, the venturi 63 is sized to restrict the maximum flow through the conduit 61 to a flow rate that will not damage the forward liner 70a and other components of the forward plenum 66 contacted by the hot gas.

The forward plenum 66 can also include a deflector plate 80 positioned to reduce the impact of the hot gas on the forward liner 70a. In one aspect of this embodiment, the conduit 61 terminates at a location flush with the bulkhead 64 such that a terminal opening 82 of the conduit is flush with a bulkhead opening 83 in the bulkhead 64. The deflector plate 80 can be a round plate offset from the conduit opening 82 and supported by a plurality of standoffs 81 connected to the conduit 61 and spaced apart around the terminal opening 82. Hot gas exiting the conduit 61 accordingly strikes the deflector plate 80 and is diverted 90° as it enters the forward plenum 66. As the hot gas turns, it also diffuses because it travels outwardly in a radial direction. One feature of this arrangement is that the hot gas will not form a jet directed toward the forward liner 70a when the hot gas is first introduced into the forward plenum 66. Such a jet may increase stress on the forward liner 70a, requiring more robust (and heavier) support for the forward liner 70a. In other embodiments, the conduit 61 and the deflector plate 80 can have other configurations, as will be discussed in greater detail below with reference to FIGS. 5A–6B.

The ice protection system 60 can include insulating layers 84 adjacent to the bulkhead 64 to protect the bulkhead 64 and the aft plenum 67 from the high temperature environment of the forward plenum 66. The bulkhead 64 is securely attached to the external surface 51 and the internal surface 52 of the inlet 50 to withstand the internal pressure of the forward plenum 66. In an alternate arrangement, the bulkhead 64 can be formed integrally with the face sheet 71a and the external portion 58 of the lip surface 55.

The pressure within the forward plenum 66 can be approximately the same as the pressure in the aft plenum 67 when the ice protection system 60 is not operating. The forward plenum 66 is pressurized up to 10 psi or higher relative to the aft plenum pressure when the ice protection system 60 is operating. Once the forward plenum 66 has been pressurized, the velocity of gas within the plenum is generally low as the gas gradually weeps out through the face sheet 71a. In one aspect of this operation, the rate of gas flow into and out of the face sheet apertures 73 (FIG. 3) due to acoustic waves passing over the face sheet 71a can be higher than the rate of flow of the hot anti-icing gas out of the face sheet apertures 73.

The ice protection system 60 can be operated according to one or more of several modes. For example, the system 60 can be operated to generate enough heat to evaporate any water droplets impinging the inlet 50. Alternatively, the system 60 can be operated to prevent the water droplets from freezing, but to still allow the water droplets to travel aft toward the engine 22 (FIG. 1). In still another mode, the system 60 can be operated intermittently to remove ice formations before they build up to a selected size.

An embodiment of the ice protection system 60 discussed above with reference to FIGS. 1–3 includes several features and advantages in addition to those previously identified. For example, in one embodiment, the ice protection system 60 provides hot gas only to the portion of the inlet 50 forward of the throat T, which is where moisture is most likely to impinge and where ice is most likely to form. Accordingly, the amount of hot gas removed from the engine 22 is less than some conventional designs that deliver hot gas to greater portions of the inlet 50. This arrangement is advantageous because it reduces the impact of the ice protection system 60 on engine thrust by reducing the amount of gas removed from the engine 22.

Another feature of an embodiment of the ice protection system 60 is that only the forward plenum 66 is pressurized with hot gas. Accordingly, the aft plenum 67 need not be constructed to withstand high internal pressures. An advantage of this feature is that the aft plenum 67 can be constructed from lighter weight components, reducing overall aircraft weight.

Figure 4A:
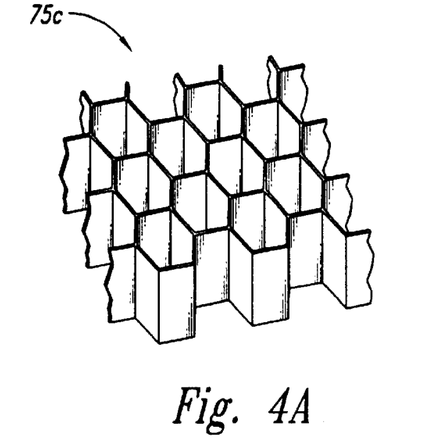
FIGS. 4A–4F are isometric views of honeycomb cores in accordance with alternate embodiments of the invention.
Figure 4B:
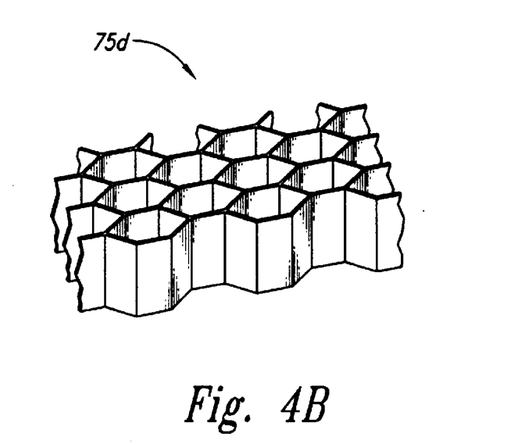

Various components of the anti-icing system 60 and the inlet 50 discussed above with reference to FIGS. 1–3 can have other configurations without deviating from the scope of the present invention. For example, the liners 70 can include honeycomb cores having different configurations than those shown in FIG. 3, such as those shown in FIGS. 4A–4F. FIG. 4A illustrates an over-expanded honeycomb core 75c having cells "stretched" in one direction. FIG. 4B illustrates under-expanded honeycomb core 75d having cells "stretched" in a transverse direction. The honeycomb cores 75c and 75d can be selectively positioned at various locations within the inlet, for example where it is desirable to have several openings in the face sheet 71a (FIG. 3) in fluid communication with the same honeycomb core cell.

Figure 4C:
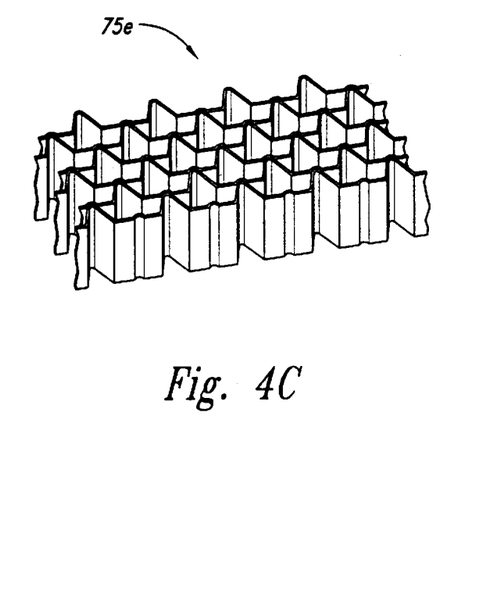
Figure 4D:
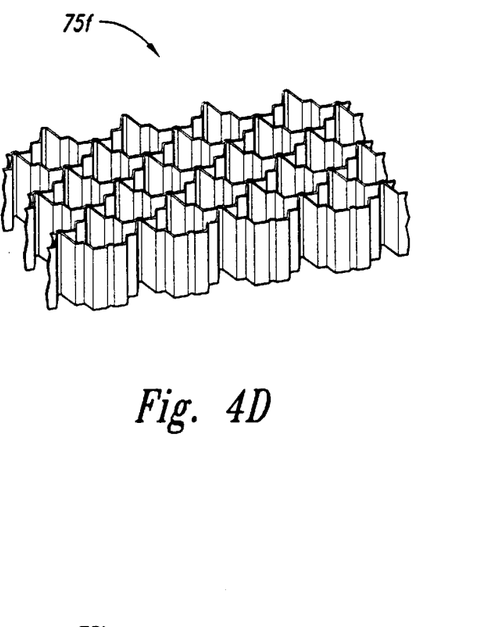
Figure 4E:
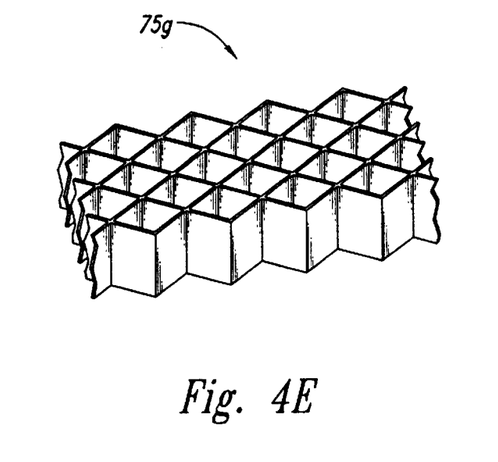
Figure 4F:
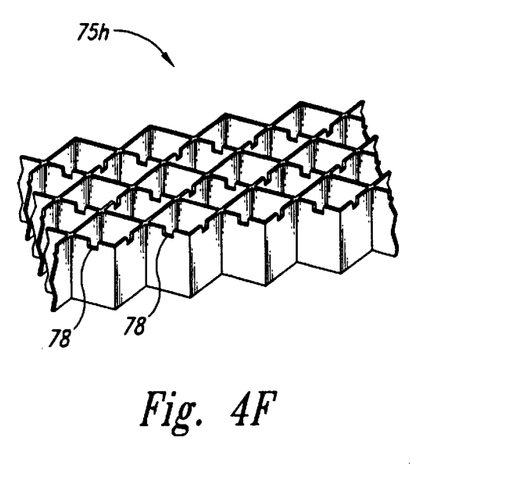

FIG. 4C illustrates a honeycomb core 75e that is flexible in one direction and FIG. 4D illustrates a honeycomb core 75f that is flexible in two transverse directions. The cores shown in FIGS. 4C and 4D can be flexed to fit into portions of the inlet having high regions of curvature, for example, near the hilite 53 (FIG. 2). FIG. 4E illustrates a honeycomb core 75g having cells with a diamond cross sectional shape and FIG. 4F illustrates honeycomb core 75h having diamond cells with slots 78 connecting adjacent cells. In one embodiment, the slots 78 connect adjacent cells in a circumferential direction around the inlet 50 (FIG. 1) to allow water to drain to the lower regions of the inlet. Axial channels (not shown) conduct the water axially to ports (not shown) in the back face of the honeycomb core 75h to drain the water away from the honeycomb core. Alternatively, the slots 78 can route hot gas from one cell to the next, for example, when not every cell is aligned with at least one back sheet aperture 74 (FIG. 3). The slots 78 can be formed in any of the honeycomb structures shown in FIGS. 3–4F.

Figure 5A:
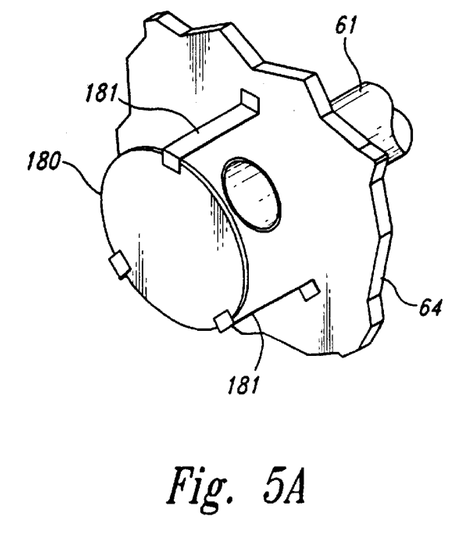
FIG. 5A is an isometric view of a flow deflector in accordance with an alternate embodiment of the invention.
Figure 5B:
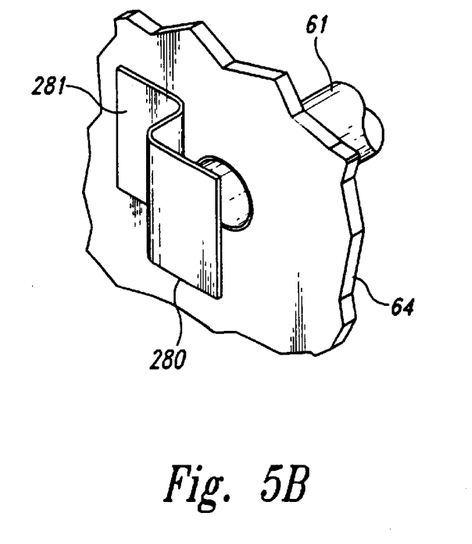
FIG. 5B is an isometric view of a flow deflector in accordance with another alternate embodiment of the invention.

FIG. 5A is a side isometric view of a deflector plate 180 supported by standoffs 181 in accordance with another embodiment of the invention. The standoffs 181 are connected to the bulkhead 64 directly, rather than to the conduit 61, as was discussed above with reference to FIG. 2. FIG. 5B is an isometric view of a deflector plate 280 connected to the bulkhead 64 with a flange 281. In other embodiments, the conduit 61 can have other deflector and/or standoff arrangements that deflect the gas arriving in the forward plenum 66 (FIG. 2) to reduce the impact of the hot gas on the forward liner 70a (FIG. 2), as was discussed above.

Figure 6A:
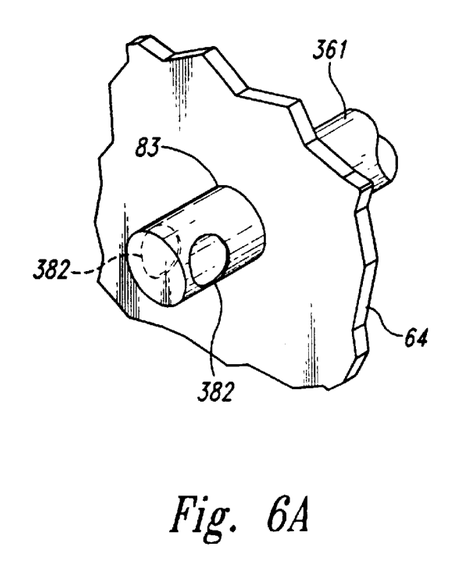
FIG. 6A is an isometric view of a portion of a conduit having two apertures for delivering hot gas to a plenum in accordance with an embodiment of the invention.

FIG. 6A is a side isometric view of a conduit 361 having two conduit openings 382 in accordance with another embodiment of the invention. In one aspect of this embodiment, the conduit 361 projects through the bulkhead opening 83 of the bulkhead 64 and into the plenum 66 (FIG. 2). Hot gas passing from the conduit 361 into the plenum 66 is deflected 90° in two directions through the conduit openings 382 to reduce the impact of the gas on the forward liner 70a (FIG. 2).

Figure 6B:
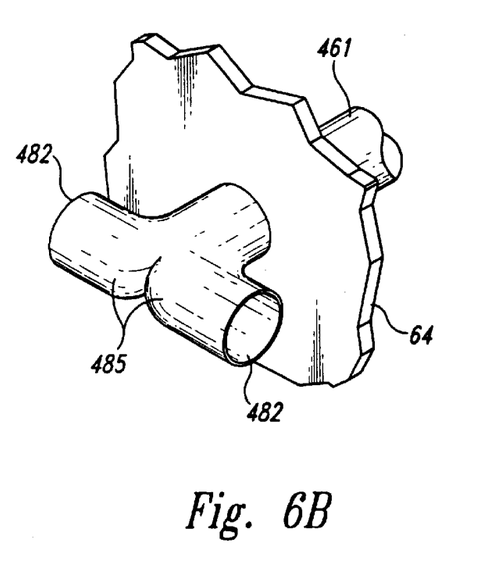
FIG. 6B is an isometric view of a portion of a conduit having two apertures for delivering hot gas to a plenum in accordance with another embodiment of the invention.

FIG. 6B is a side isometric view of a conduit 461 having two transverse sections 485, each with a conduit opening 482. Accordingly, the conduit 461 can deflect the flow entering the plenum 66 (FIG. 2) in two transverse directions. The conduits shown in FIGS. 6A and 6B do not require a deflector plate 80 (FIG. 2) because the terminal ends of the conduits deflect the gas away from the forward liner 70a (FIG. 2).

Figure 7:
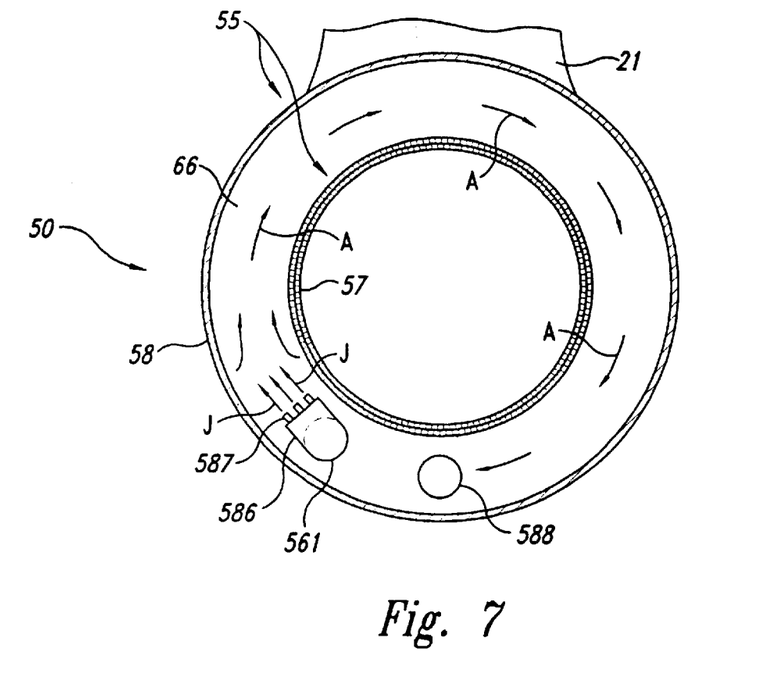
FIG. 7 is a cross-sectional view of a portion of a nacelle having a swirl-tube for delivering hot gas to a plenum in accordance with yet another embodiment of the invention.

FIG. 7 is a cross-sectional view of an embodiment of the inlet 50 shown in FIG. 1 (looking aft from a point forward of the bulkhead 64), in which the inlet 50 includes a swirl tube conduit 561. The swirl tube conduit 561 has an elbow 586 that turns the incoming hot gas 90° to point in a circumferential direction in the annulus between the exterior portion 58 and the interior portion 57 of the lip surface 55. The hot gas is expelled from the elbow 586 through a plurality of ejector ports 587 to form high velocity jets "J". The high velocity jets J exiting the ports 587 entrain gas in the forward plenum 66, causing the gas to circulate at high speed in a clockwise direction, as indicated by arrows "A". A portion of the circulating gas is removed through an exhaust port 588 to allow additional hot gas to enter the plenum. The circulating gas also transpires through the exterior portion 58 and the interior portion 57 in a manner generally similar to that discussed above with reference to FIGS. 1–3. Furthermore, the high speed circulating gas "scrubs" the interior portion 57 and the exterior portion 58, to enhance the heat transfer to these surfaces. Accordingly, the swirl tube conduit 561 can increase the rate at which the heat is transferred to the lip surface 55.

Figure 8:
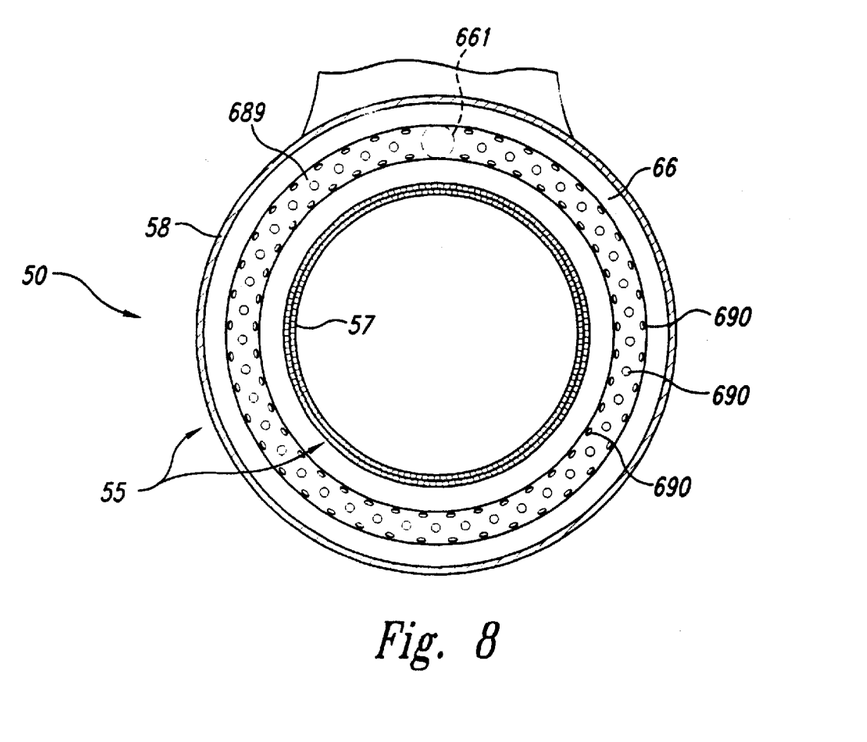
FIG. 8 is a cross-sectional view of a portion of a nacelle having a spray bar for delivering hot gas to a plenum in accordance with still another embodiment of the invention.

FIG. 8 is a cross-sectional view of the inlet 50 shown in FIG. 7 having a conduit 661 in accordance with another embodiment of the invention. The conduit 621 is coupled to a spray tube 689 that is positioned annularly between the interior portion 57 and the exterior portion 58 of the lip surface 55. The spray tube 689 includes a plurality of perforations or apertures 690 that distribute the hot gas from the conduit 661 to the forward plenum 66. One feature of the spray tube 689 shown in FIG. 8 is that it may uniformly distribute the hot gas around the circumference of the inlet 50. Conversely, an advantage of the conduits shown in FIGS. 2, 5A–B, and 6A–B is that the conduits terminate near the bulkhead 64 of the forward plenum 66 and may accordingly be lighter than the spray tube 689 shown in FIG. 8. The conduits shown in FIGS. 2, 5A–B and 6A–B may also be less susceptible to corrosion because they are not perforated.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An ice protection system for an aircraft engine inlet, comprising:
    an external surface portion;
    an internal surface portion positioned inwardly of the external surface portion;
    a lip surface portion extending between the external surface portion and the internal surface portion to define a hilite, at least one of the lip surface portion and the internal surface portion defining an inlet flow surface having a minimum flow area aft of the hilite, the inlet flow surface having first apertures defining a first porosity;
    a back surface offset from the inlet flow surface having second apertures defining a second porosity less than the first porosity, the second apertures being coupleable to a source of pressurized, heated gas and being sized to direct a quantity of the gas through the first apertures sufficient to at least restrict the formation of ice on the inlet flow surface; and
    an acoustic core positioned between the back surface and the inlet flow surface with at least a portion of the first apertures in fluid communication with the second apertures through the acoustic core.

2. The system of claim 1 wherein the second apertures are sized to choke the flow of gas through the back surface.

3. The system of claim 1 wherein the inlet flow surface has a porosity of about 3% to about 10%.

4. The system of claim 1 wherein the first apertures have a diameter of about 0.008 inch and the second apertures have a diameter of about 0.002 inch.

5. The system of claim 1 wherein the back surface has a porosity of from about 0.12% to about 0.20%.

6. The system of claim 1 wherein a number of second apertures per unit area of the back surface is approximately equal to a number of first apertures per unit area of inlet flow surface.

7. An ice protection system for an aircraft engine inlet, comprising:
    an external surface portion;
    an internal surface portion positioned inwardly of the external surface portion;

a lip surface portion extending between the external surface and the internal surface portion to define a hilite, at least one of the lip surface portion and the internal surface portion defining an inlet flow surface having a minimum flow area aft of the hilite, the inlet flow surface having first apertures extending therethrough the inlet flow surface having a first porosity;

a back surface offset from the inlet flow surface and having second apertures extending therethrough, the second apertures being coupleable to a source of pressurized, heated gas to direct a quantity of the gas through the first apertures sufficient to at least restrict formation of ice on the inlet flow surface the back surface having a second porosity less than the first porosity; and a sound-attenuating acoustic core positioned between the back surface and the inlet flow surface with the first apertures in fluid communication with the second apertures through the acoustic core, the acoustic core including at least one intermediate layer between the back surface and the inlet flow surface, the intermediate layer having third apertures in fluid communication with the first and second apertures.

8. The system of claim 7 wherein the core includes first cells between the inlet flow surface and the intermediate layer and second cells aligned with the first cells and positioned between the intermediate layer and the back surface, the first cells bonded to one side of the intermediate layer and the second cells bonded to an oppositely facing side of the intermediate layer.

9. The system of claim 7 wherein the intermediate layer has a third porosity less than or equal to the first porosity and greater than or equal to the second porosity.

10. An ice protection system for an aircraft engine inlet, comprising:

an external surface portion;

an internal surface portion positioned inwardly of the external surface portion;

a lip surface portion extending between the external surface portion and the internal surface portion to define a hilite, at least one of the lip surface portion and the internal surface portion defining an inlet flow surface having a minimum flow area aft of the hilite, the inlet flow surface having first apertures extending therethrough;

a back surface offset from the inlet flow surface and the internal surface and having second apertures extending therethrough sized to pass to the first apertures a quantity of heated gas sufficient at least restrict formation of ice on the inlet flow surface;

a sound-attenuating acoustic core positioned between the back surface and the inlet flow surface with the first apertures in fluid communication with the second apertures through the acoustic core;

a plenum wall adjacent to the back surface, the plenum wall and the back surface at least partially defining a plenum; and a conduit coupleable to a source of pressurized heated gas, the conduit being coupled to the plenum and having at most two exit openings in fluid communication with the plenum sized to direct the quantity of heated gas into the plenum through the second apertures, then through the first apertures.

11. The system of claim 10, further comprising a venturi coupled to the conduit to limit a peak flow rate of the heated gas through the conduit.

12. The system of claim 10 wherein the first apertures define a first porosity and the second apertures define a second porosity less than the first porosity.

13. The system of claim 10, further comprising a flow regulating valve coupled to the conduit.

14. The system of claim 10 wherein the conduit terminates at a single opening in the plenum wall, the conduit having a single conduit opening positioned annularly within the opening in the plenum wall, and the protection system further comprises a deflector plate positioned within the plenum and spaced apart from the single conduit opening.

15. The system of claim 14 wherein the deflector plate is supported by at least one support member connected to the conduit.

16. The system of claim 14 wherein the deflector plate is supported by at least one support member connected to the plenum wall.

17. The system of claim 14 wherein the conduit enters the plenum at a single location and has two openings within the plenum, each opening sized to provide to the plenum approximately half the quantity of heated gas sufficient to at least restrict formation of ice on the inlet flow surface.

18. An ice protection system for an aircraft engine inlet, comprising:

a titanium external surface portion;

a titanium internal surface portion positioned inwardly from the external surface portion;

a titanium lip surface portion extending between the external surface portion and the internal surface portion to define a hilite, at least one of the lip surface portion and the internal surface portion defining an inlet flow surface having a minimum flow area aft of the hilite, the inlet flow surface having first apertures extending therethrough the inlet flow surface having a first porosity;

a titanium back surface offset from the inlet flow surface and having second apertures extending therethrough, the second apertures coupleable to a source of pressurized heated gas and sized to pass a quantity of the gas selected to at least restrict formation of ice on the inlet flow surface the back surface having a second porosity less than the first porosity; and a titanium sound-attenuating acoustic core positioned between the back surface and the inlet flow surface with the first perforations in fluid communication with the second perforations through the acoustic core, the back surface of the acoustic core being coupleable to a source of pressurized, heated gas having a temperature of at least 400° F.

19. The system of claim 18, further comprising the source of gas, the source of gas including at least one portion of a compressor of the aircraft engine.

20. A method for forming an ice protection system for an aircraft engine inlet, comprising:

disposing an acoustic core between a flow surface of the inlet and a back surface offset from the flow surface;

forming first apertures through the flow surface to provide the flow surface with a first porosity; and forming second apertures through the back surface to provide the back surface with a second porosity less than the first porosity, the second apertures sized to pass a sufficient quantity of pressurized, heated gas through the first apertures to at least restrict ice formation on the flow surface.

21. The method of claim 20, further comprising forming the second apertures to be aligned with a region only at and/or forward of a minimum flow area of the inlet.

22. A method for forming an ice protection system for an aircraft engine inlet, comprising:

disposing a titanium acoustic core between a titanium flow surface of the inlet and a titanium back surface offset from the flow surface;

forming first apertures in the flow surface the inlet flow surface having a first porosity;

forming second apertures through the back surface the back surface having a second porosity less than the first porosity, the second apertures sized to pass a sufficient quantity of pressurized, heated gas through the first apertures to at least restrict ice formation on the flow surface; and coupling to the second apertures a source pressurized heated gas having a temperature of at least approximately 400° F.

23. The method of claim 22, further comprising forming the first apertures to have a first porosity in the flow surface greater than a second porosity of the second apertures in the second surface.

24. An ice protection system for an aircraft engine inlet, comprising:

an external surface portion;

an internal surface portion positioned inwardly of the external surface portion;

a lip surface portion extending between the external surface portion and the internal surface portion to define a hilite, at least one of the lip surface portion and the internal surface portion defining an inlet flow surface having a minimum flow area aft of the hilite, the inlet flow surface having a first porosity and a first flow resistance;

a back surface offset from the inlet flow surface having a second porosity and a second flow resistance greater than the first flow resistance, the back surface being coupleable to a source of pressurized, heated gas and being configured to direct a quantity of the gas therethrough and through the inlet flow surface sufficient to at least restrict the formation of ice on the inlet flow surface; and an acoustic core positioned between the back surface and the inlet flow surface with at least a portion of the first apertures in fluid communication with the second apertures through the acoustic core.

* * * * *